(12) United States Patent
Alexandron et al.

(10) Patent No.: US 8,095,700 B2
(45) Date of Patent: Jan. 10, 2012

(54) CONTROLLER AND METHOD FOR STATISTICAL ALLOCATION OF MULTICHANNEL DIRECT MEMORY ACCESS BANDWIDTH

(75) Inventors: Nimrod Alexandron, Shimshit (IL); Alexander Rabinovitch, Kfar Yona (IL); Leonid Dubrovin, Karnei Shomron (IL)

(73) Assignee: LSI Corporation, Milpitas, CA (US)

( * ) Notice: Subject to any disclaimer, the term of this patent is extended or adjusted under 35 U.S.C. 154(b) by 239 days.

(21) Appl. No.: 12/467,228

(22) Filed: May 15, 2009

(65) Prior Publication Data
US 2010/0293304 A1    Nov. 18, 2010

(51) Int. Cl.
*G06F 13/28* (2006.01)

(52) U.S. Cl. ............ 710/22; 710/28; 710/52; 710/72; 710/25

(58) Field of Classification Search .......... 710/28, 710/22, 52, 72
See application file for complete search history.

(56) References Cited

U.S. PATENT DOCUMENTS

| | | | |
|---|---|---|---|
| 5,954,809 A * | 9/1999 | Riley et al. ............ 710/119 |
| 6,430,194 B1 | 8/2002 | Ilyadis et al. |
| 6,704,847 B1 * | 3/2004 | Six et al. ............ 711/151 |
| 6,823,412 B2 | 11/2004 | Regis |
| 7,085,875 B1 | 8/2006 | Yona et al. |
| 7,240,129 B2 * | 7/2007 | Hayden et al. ............ 710/22 |
| 7,293,121 B2 * | 11/2007 | Hayden ............ 710/22 |
| 7,360,068 B2 | 4/2008 | Borgatti et al. |
| 7,392,330 B2 | 6/2008 | Weatherspoon |
| 7,484,016 B2 * | 1/2009 | Shah et al. ............ 710/22 |
| 7,533,195 B2 * | 5/2009 | Hayden ............ 710/22 |
| 7,760,768 B2 * | 7/2010 | Lee ............ 370/537 |
| 2005/0030971 A1 | 2/2005 | Yuan |

FOREIGN PATENT DOCUMENTS

WO    WO0239631 A1    5/2002

OTHER PUBLICATIONS

Multichannel Bandwidth Allocation in a Broadband Packet Switch; A. Pattavina; IEEE Journal, vol. 6, Issue 9; Dec. 1988; pp. 1489-1499.

* cited by examiner

*Primary Examiner* — Tammara Peyton

(57) ABSTRACT

A DMA controller and a method for statistical allocation of multichannel DMA bandwidth. In one embodiment, the DMA controller includes: (1) channel interfaces including respective counters and configured to provide request signals, priority signals and counter value signals representing current values of the counters at a given time and (2) a grant control unit coupled to the channel interfaces and configured to grant DMA access to one of the channel interfaces based on values of the priority signals and the counter value signals.

18 Claims, 2 Drawing Sheets

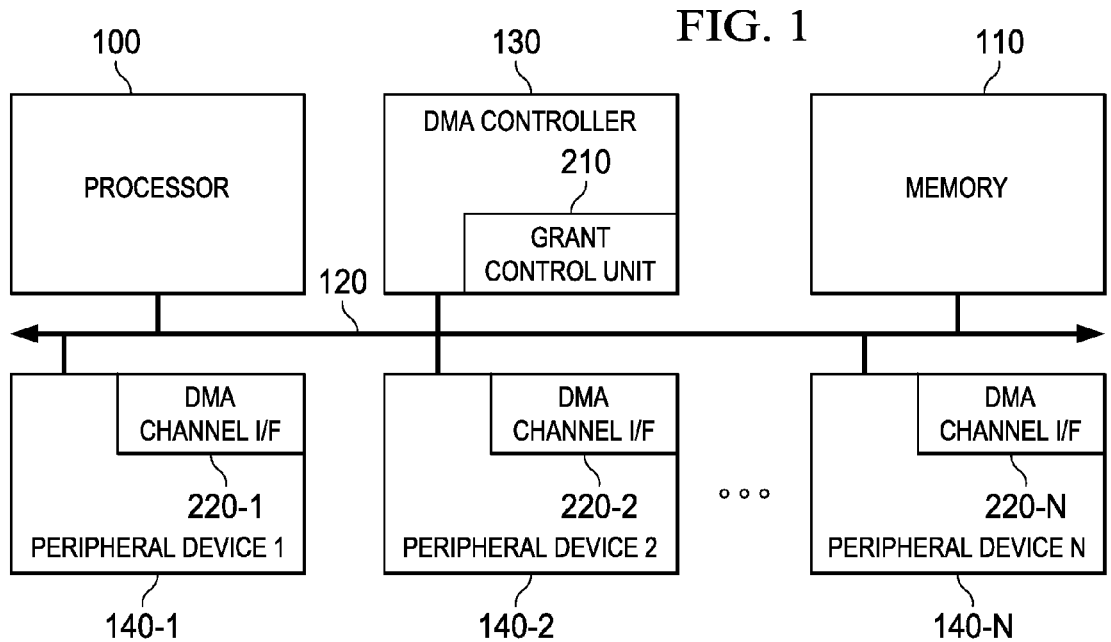
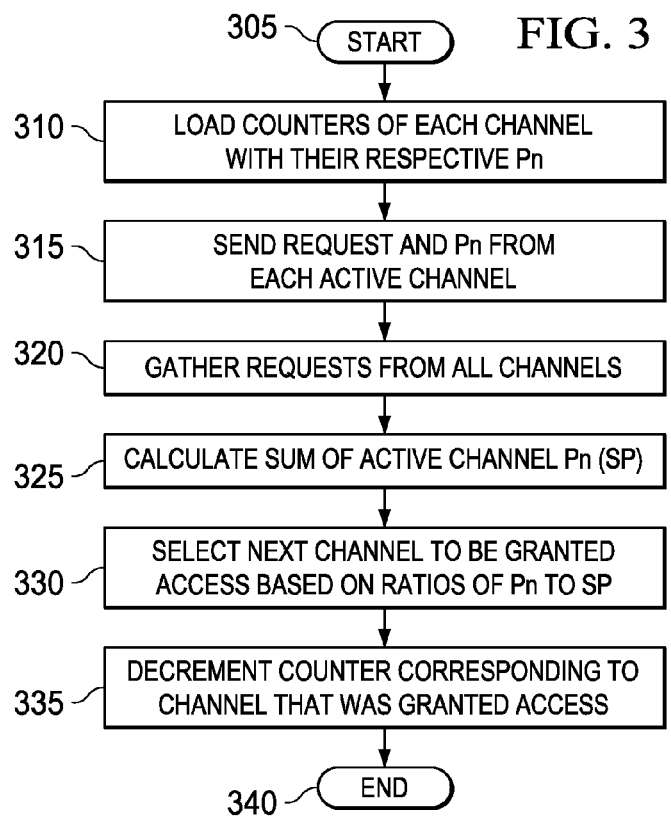

CONTROLLER AND METHOD FOR STATISTICAL ALLOCATION OF MULTICHANNEL DIRECT MEMORY ACCESS BANDWIDTH

TECHNICAL FIELD

This application is directed, in general, to direct memory access (DMA) and, more specifically, to a controller and method for statistical allocation of multichannel DMA bandwidth.

BACKGROUND

In the simplest computer systems, the processor manages the movement of data between the memory and peripheral devices, such as graphics subsystems and ports. Unfortunately, this burdens the processor with not only processing, but moving, all data. As a result, the processor's speed frequently limits the computer's overall performance. More complex computer systems employ direct memory access (DMA). In DMA, a DMA controller separate from the processor moves data between the memory and peripheral devices. The processor's role is therefore reduced, and the computer's overall performance is enhanced.

In computer systems having multiple peripheral devices, each peripheral device is assigned a DMA channel, and allocation (called "granting") of DMA bandwidth (sometimes expressed in terms of "time slots") between or among the channels becomes a challenge. In those systems in which the channels are of equal priority, bandwidth is granted based on a round-robin algorithm. In those systems in which the channels are of unequal priority, higher-priority channels are granted bandwidth until they no longer require it. Only then is bandwidth granted to lower-priority channels. The disadvantage of the latter approach is that the lower-priority channels may receive insufficient bandwidth.

One example of the latter approach is found in U.S. Patent Publication 2006/0004931, in which memory access bandwidth within a digital camera is allocated among several channels by assigning each channel a "tokens per snapshot" (TPS) value. Each channel has a DMA engine and a DMA entry queue. If the channel wishes to access the memory, then a DMA entry is pushed onto the DMA entry queue of the channel. An arbiter uses the TPS values to select DMA entries off the various queues for incorporation into a "snapshot." The arbiter then selects DMA entries from the snapshot in an order for servicing such that memory access overhead in accessing the memory is reduced. Only after all DMA entries of the snapshot have been serviced is another snapshot of entries selected. Maximum latency in servicing a queue is controlled by assigning each queue a time-out value (TOV). If a queue times out, then that queue is moved up in the order of servicing.

In U.S. Pat. No. 6,430,194, bus access is arbitrated among modules connected to a common bus. Each module has a priority level and an arbitration number assigned to it. More than one module can have the same priority level. For each priority level, the arbitration numbers assigned are unique. When two or more modules attempt bus access at the same time, the one with the higher priority level wins access. If the priority levels are the same but one module has already accessed the bus, the module that has been waiting wins access. If the modules have the same priority level and have been waiting then the module with the highest arbitration number wins access.

U.S. Pat. No. 7,085,875 discloses a modular switch, comprising a plurality of backplane sub-buses; a plurality of cards which are each allocated one or more of the backplane sub-buses and a controller that dynamically allocates the backplane sub-buses to the plurality of cards, based on the bandwidth needs of the cards. Preferably, the bandwidth capacity of substantially all the backplane sub-buses is less than the sum of the maximal transmission bandwidth capacities of the cards.

In U.S. Pat. No. 7,360,068, a dynamically reconfigurable processing unit includes a microprocessor and an embedded flash memory for nonvolatile storage of code, data and bitstreams. The embedded flash memory includes a field programmable gate array (FPGA) port. The reconfigurable processing unit further includes a direct memory access (DMA) channel, and an SRAM embedded FPGA for FPGA reconfigurations. The SRAM embedded FPGA has an FPGA programming interface connected to the FPGA port of the flash memory through the DMA channel interface.

PCT Application No. WO/2002/039631 discloses a method of prioritizing network resources in a network that includes providing the network with a high priority channel and a low priority channel. The high priority channel has insufficient bandwidth resources to transmit a message on the high priority channel. The high priority channel reserves bandwidth resources from a local free list. If this is insufficient, the high priority channel preempts bandwidth resources of the low priority channel. If this is insufficient to send the message, the high priority channel obtains bandwidth resources from the nodes in the network so the message can be send on the high priority channel.

SUMMARY

One aspect provides a DMA controller. In one embodiment, the DMA controller includes: (1) channel interfaces including respective counters and configured to provide request signals, priority signals and counter value signals representing current values of the counters at a given time and (2) a grant control unit coupled to the channel interfaces and configured to grant DMA access to one of the channel interfaces based on values of the priority signals and the counter value signals.

Another aspect provides a method of statistically allocating multichannel DMA bandwidth. In one embodiment, the method includes: (1) providing request signals, priority signals and counter value signals representing current values for counters of channel interfaces at a given time and (2) granting DMA access to one of the channel interfaces based on values of the priority signals and the counter value signals.

BRIEF DESCRIPTION

Reference is now made to the following descriptions taken in conjunction with the accompanying drawings, in which:

FIG. 1 is a block diagram of a computer system employing DMA in which a controller or method for statistical allocation of multichannel DMA bandwidth may be incorporated or carried out;

FIG. 3 is a flow diagram of one embodiment of a method of statistically allocating multichannel DMA bandwidth.

DETAILED DESCRIPTION

Figure 2:
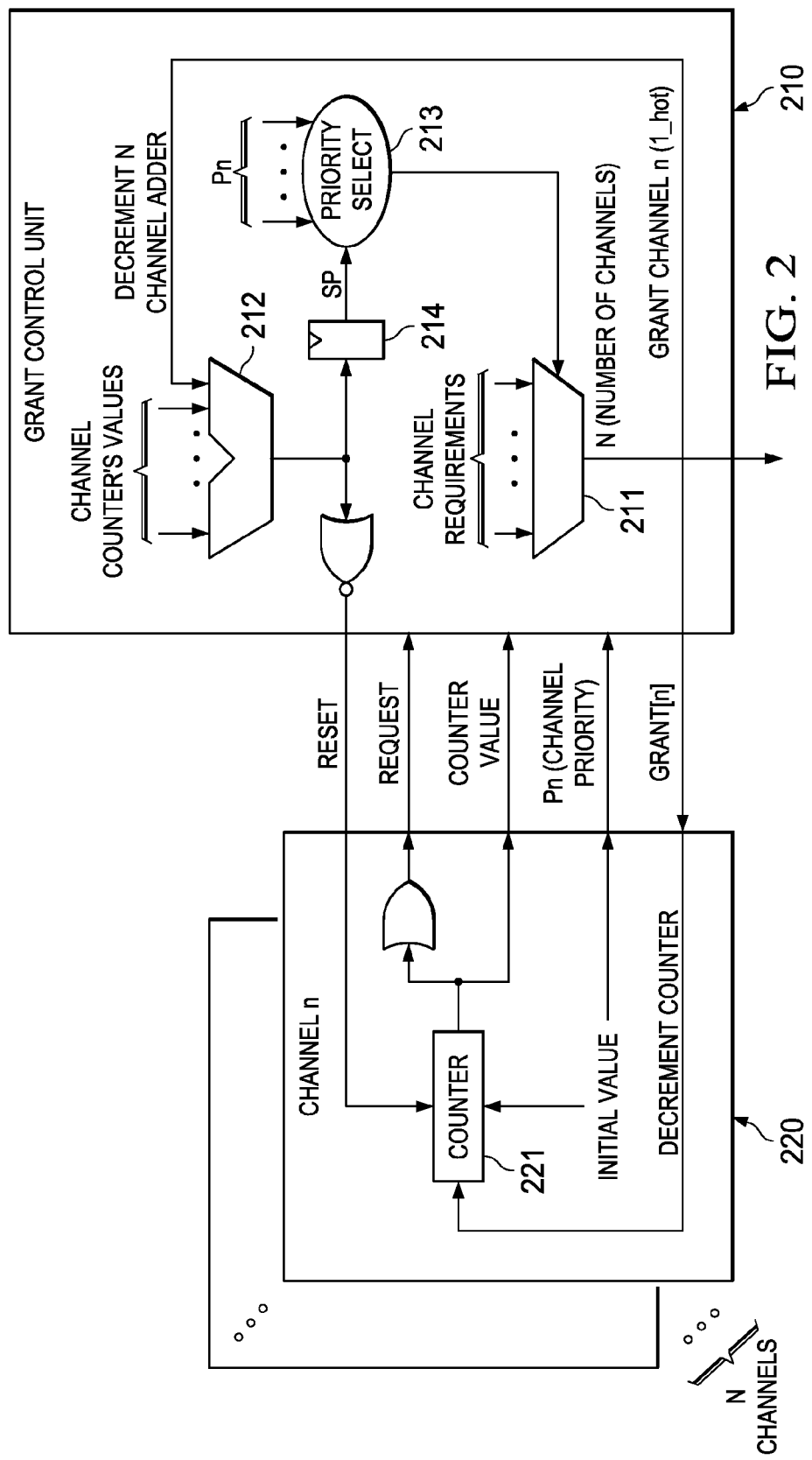
FIG. 2 is a block diagram of one embodiment of a controller for statistical allocation of multichannel DMA bandwidth.

As described above, in computer systems having multiple channels of unequal priority, higher-priority channels are granted bandwidth until they no longer require it. Only then is bandwidth granted to lower-priority channels. Again, the disadvantage of this approach is that the lower-priority channels may receive insufficient bandwidth.

Introduced herein are various embodiments of controllers and methods for allocating DMA bandwidth that can yield a better overall system performance by allowing all channels to receive a time slot for transferring their data. Conventional approaches do not allow priority to be given to channels according to their weight while continuing to guarantee that lower priority channels are granted at least an occasional time slot.

FIG. 1 is a block diagram of a computer system employing DMA in which a controller or method for statistical allocation of multichannel DMA bandwidth may be incorporated or carried out. The system employs a processor 100 and a memory 110, coupled together by a bus 120. The processor 100, memory 110 and bus 120 may be of any conventional or later-developed type. As described above, the system employs DMA to relieve the processor 100 of having to manage at least some transfers of data into or out of the memory 110. Accordingly, a DMA controller 130 is provided for such purpose.

As those skilled in the art understand, the DMA controller 130 is configured to grant to various peripheral devices (e.g., a peripheral device 1 140-1, a peripheral device 2, 140-2 and a peripheral device N 140-N) temporary access to the memory 110 via the bus 120. Temporary access will sometimes be referred to herein in terms of one or more "slots." Since multiple peripheral devices exist in the embodiment of FIG. 1, a contention for resources (expressed in terms of bandwidth) also exists. Among other things, the DMA controller 130 is configured to resolve the contention such that overall performance is at or near its highest possible level. To achieve this, the DMA controller 130 includes a grant control unit (GCU) 210, and each peripheral device includes a DMA channel interface. More specifically, peripheral device 1 140-1 includes a DMA channel interface 220-1, peripheral device 2 140-2 includes a DMA channel interface 220-2, and peripheral device N 140-N includes a DMA channel interface 220-N. The DMA channel interfaces 220-1, 220-2, 220-N and the GCU 210 cooperate with one another to manage DMA bandwidth. The DMA controller 130 also includes a GCU 210. Various embodiments of the GCU 210 and the DMA channel interfaces 220-1, 220-2, 220-N will now be described in greater detail.

FIG. 2 is a block diagram of one embodiment of a controller for statistical allocation of multichannel DMA bandwidth. FIG. 2 shows the GCU 210 of FIG. 1 and groups the DMA channel interfaces 220-1, 220-2, 220-N of FIG. 1 together into n channel interfaces 220. In the embodiment of FIG. 2, each channel is assigned its own, unique priority. Each of the n channel interfaces 220 includes a counter 221 configured to provide a request signal and a signal representing its current value at a given time to the GCU 210. The counter 221 is further configured to receive a priority signal, which represents the channel's priority and will be designed herein as Pn. The counter 221 is still further configured to decrement upon receipt of a grant signal, i.e., when the GCU 210 grants DMA access to that channel. The counter 221 is yet further configured to receive a reset signal from the GCU 220, whereupon the counter 221 is reset to the initial value.

The GCU 220 includes a multiplexer 211 configured to receive and select among a plurality of request signals received from the n channel interfaces 220. The GCU 220 further includes a mathematical function block (an adder 212 in the context of FIG. 2) configured to receive a plurality of counter value signals received from the n channel interfaces 220 and apply a mathematical function to their values to yield a result. In the illustrated embodiment, the adder 212 is configured to receive the plurality of counter value signals and add at least some of their values together to yield a sum. In a more specific embodiment, only the values of the counter value signals corresponding to active ones of the channels are added. The GCU 220 still further includes a priority select module 213 configured to receive and select among the priority signals received from the n channel interfaces 220 based on the values of the various priority signals and the sum of the counter value signals as received from a register 214. In a more specific embodiment, the priority select module 213 makes its selection based on the ratios of each of the values of the various priority signals to the sum of the active ones of the channels.

Various embodiments will now be described by the priority select module 213 may use this ratio to grant requests. One example embodiment calls for sequential execution and operates as follows. First, each counter is initialized with its priority. An example priority for a particular channel 220 may be six. Afterwards, the counters are decremented as the GCU 210 grants access to corresponding channels. Channels having the same counter value at any given time may then be changed round-robin or by any other evenhanded scheme.

Another example embodiment calls for nonsequential execution and operates as follows. First, the GCU 210 generates a table containing a list of each active channel 220. The table has a number of entries equal to SP, and each channel 220 has Pn entries in the table. The GCU 210 also generates a pseudorandom integer number R in the group [1 ... SP], and the GCU 210 grants access to the channel 220 entered at address R. For example, if two channels having respective priorities of three and two exist, Table 1, below, results:

TABLE 1

Example Nonsequential Execution Table

Channel 1
Channel 1
Channel 1
Channel 2
Channel 2

In general, the illustrated embodiment of the controller operates as follows. Each channel 220 has its own priority (Pn). Upon initialization, the counter 221 for each channel is loaded with its respective Pn. Then, each channel 220 needing DMA access (i.e., active channel) sends its request along with its Pn. The GCU 210 then gathers the requests from all channels, and calculates the SP value (sum of Pn) and latches it. The priority select module picks the next channel to be granted sequentially or nonsequentially as described above or by another execution technique. The channel that was granted access then decrements its counter. When all the channel's counters 220 are cleared, the counters are reset and reloaded with their respective Pn.

FIG. 3 is a flow diagram of one embodiment of a method of statistically allocating multichannel DMA bandwidth. The method begins in a start step 305. In a step 310, the counters of each channel are loaded with their respective Pn. In a step 315, each active channel sends its request along with its Pn. In a step 320, the requests from all channels are gathered. In a step 325, SP (the sum of active channel Pn) is calculated. In a step 330, The next channel to be granted access is selected based on ratios of Pn to SP. In a step 335, the counter corresponding to the channel that was granted access is then decremented.

Those skilled in the art to which this application relates will appreciate that other and further additions, deletions, substitutions and modifications may be made to the described embodiments.

What is claimed is:

1. A DMA controller, comprising: channel interfaces including respective counters which represent a priority of a corresponding channel and configured to provide request signals, priority signals and counter value signals representing current values of said counters at a given time; and a grant control unit coupled to said channel interfaces and configured to grant DMA access to one of said channel interfaces based on values of said priority signals and said counter value signals; said grant control unit including a priority select module configured to receive and select among said priority signals based on ratios of each of said values of said priority signals to said sum of said counter value signals corresponding to active ones of said channel interfaces.

2. The DMA controller as recited in claim 1 wherein said grant control unit includes a multiplexer configured to receive and select among said request signals.

3. The DMA controller as recited in claim 1 wherein said grant control unit includes an adder configured to receive and add at least some values of said counter value signals.

4. The DMA controller as recited in claim 3 wherein said adder is configured to add only said values of said counter value signals corresponding to active ones of channels.

5. The DMA controller as recited in claim 1 wherein said priority select module is further configured to select among said priority signals based on values thereof and a mathematical function of said counter value signals.

6. The DMA controller as recited in claim 1 wherein said grant control unit is configured to cause a counter associated with said one of said channel interfaces to decrement upon said granting of said DMA access.

7. The DMA controller as recited in claim 1 wherein said counters are further configured to receive a reset signal from said grant control unit and respond thereto by assuming an initial value representing a priority.

8. The DMA controller as recited in claim 1 wherein said priority select module is configured to grant said DMA access using sequential execution.

9. The DMA controller as recited in claim 1 wherein said priority select module is configured to grant said DMA access using nonsequential execution.

10. A method of statistically allocating multichannel DMA bandwidth, comprising: providing request signals, priority signals and counter value signals representing current values for counters which represent a priority of a corresponding channel of channel interfaces at a given time; granting DMA access to one of said channel interfaces based on values of said priority signals and said counter value signals, wherein said granting includes selecting among said priority signals based on ratios of each of said values of said priority signals to said sum of said counter value signals corresponding to active ones of said channel interfaces.

11. The method as recited in claim 10 further comprising selecting among said request signals.

12. The method as recited in claim 10 further comprising adding at least some values of said counter value signals.

13. The DMA controller as recited in claim 12 further comprising adding only said values of said counter value signals corresponding to active ones of channels.

14. The method as recited in claim 10 wherein said granting includes selecting among said priority signals based on values thereof and a mathematical function of said counter value signals.

15. The method as recited in claim 10 further comprising causing a counter associated with said one of said channel interfaces to decrement upon said granting of said DMA access.

16. The method as recited in claim 10 further comprising responding, with said counters, to a reset signal unit by assuming an initial value representing a priority.

17. The method as recited in claim 10 further comprising granting said DMA access using sequential execution.

18. The method as recited in claim 10 further comprising granting said DMA access using nonsequential execution.

* * * * *